(12) United States Patent
Perissinotto et al.

(10) Patent No.: US 10,495,193 B2
(45) Date of Patent: Dec. 3, 2019

(54) CHAIN DRIVE HAVING A PLURALITY OF SLIDING ELEMENTS

(71) Applicant: iwis motorsysteme GmbH & Co. KG, München (DE)

(72) Inventors: Renzo Perissinotto, Dachau (DE); Henning Geibel, Wessling (DE)

(73) Assignee: IWIS MOTORSYSTEME GMBH & CO. KG, München (DE)

( * ) Notice: Subject to any disclaimer, the term of this patent is extended or adjusted under 35 U.S.C. 154(b) by 277 days.

(21) Appl. No.: 15/514,359

(22) PCT Filed: Sep. 25, 2015

(86) PCT No.: PCT/EP2015/001908
§ 371 (c)(1),
(2) Date: Mar. 24, 2017

(87) PCT Pub. No.: WO2016/050345
PCT Pub. Date: Apr. 7, 2016

(65) Prior Publication Data
US 2017/0276216 A1      Sep. 28, 2017

(30) Foreign Application Priority Data

Oct. 2, 2014   (DE) .................. 10 2014 014 720
Jul. 8, 2015   (DE) .................. 10 2015 008 877

(51) Int. Cl.
*F16H 7/08*      (2006.01)
*F16H 7/18*      (2006.01)

(52) U.S. Cl.
CPC ................ *F16H 7/08* (2013.01); *F16H 7/18* (2013.01); *F16H 2007/185* (2013.01)

(58) Field of Classification Search
CPC ...... F16H 7/18; F16H 7/08; F16H 2007/0872; F16H 2007/0874; F16H 2007/0893
(Continued)

(56) References Cited

U.S. PATENT DOCUMENTS 5,180,340 A  *  1/1993  Vahabzadeh ............ F16G 13/04
                                                   474/111
5,967,922 A  *  10/1999  Ullein ...................... F01L 1/02
                                                   474/111
(Continued)

FOREIGN PATENT DOCUMENTS

CN       1820154 A      8/2006
CN     101358643 A      2/2009
(Continued)

*Primary Examiner* — Henry Y Liu
(74) *Attorney, Agent, or Firm* — Baker & Hostetler LLP

(57) ABSTRACT

A chain drive for an internal combustion engine comprises a driving sprocket and at least one driven sprocket, a drive chain coupling the sprockets to each other, and at least one guide rail and/or one tensioning rail for guiding and/or tensioning the drive chain. At least the guide rail and/or the tensioning rail comprises at least two slide elements, arranged at a non-guided distance from one another for contacting the drive chain, such that at least two slide elements are arranged in at least one span of the chain drive. In at least one span, the ratio of guided chain length to non-guided chain length is smaller than 1. Such a chain drive is to be improved with respect to its vibration characteristics. To this end, the sum of the two non-guided lengths of the drive chain between a slide element and the respective nearest sprocket is, in at least one span, which is in contact with a guide rail and/or a tensioning rail with at least two slide elements arranged at a non-guided distance from one another, smaller than 0.5 times the total length of the respective span.

17 Claims, 8 Drawing Sheets

(58) Field of Classification Search
USPC .................................................. 474/140, 111
See application file for complete search history.

(56) References Cited

U.S. PATENT DOCUMENTS

| | | | | |
|---|---|---|---|---|
| 6,358,169 | B1* | 3/2002 | Markley | ............... F02B 67/06 |
| | | | | 474/111 |
| 6,375,587 | B1* | 4/2002 | Wigsten | ............... F16H 7/08 |
| | | | | 474/109 |
| 7,597,640 | B2* | 10/2009 | Markley | ............... F16H 7/18 |
| | | | | 474/109 |
| 8,387,244 | B2* | 3/2013 | Markley | ............... F01L 1/022 |
| | | | | 123/90.31 |
| 8,715,122 | B2* | 5/2014 | Young | ............... F16H 7/08 |
| | | | | 474/111 |
| 8,876,642 | B2* | 11/2014 | Adams | ............... F16H 7/18 |
| | | | | 474/111 |
| 8,986,142 | B2* | 3/2015 | Shintani | ............... F16H 7/18 |
| | | | | 474/111 |
| 9,689,475 | B2* | 6/2017 | Geibel | ............... F16H 7/08 |
| 2014/0179472 | A1* | 6/2014 | Kato | ............... F16H 7/18 |
| | | | | 474/111 |
| 2016/0097439 | A1* | 4/2016 | Geibel | ............... F16H 7/08 |
| | | | | 474/111 |
| 2016/0102737 | A1* | 4/2016 | Geibel | ............... F16H 7/08 |
| | | | | 474/111 |
| 2018/0231106 | A1* | 8/2018 | Stiglmaier | ............... F16H 7/18 |

FOREIGN PATENT DOCUMENTS

| | | |
|---|---|---|
| CN | 102884341 A | 1/2013 |
| CN | 102966709 A | 3/2013 |
| CN | 104029335 A | 9/2014 |
| DE | 195 36 643 A1 | 4/1997 |
| DE | 19905579 A1 | 8/2000 |
| DE | 10 2007 026939 A1 | 12/2008 |
| DE | 10 2011 017769 A1 | 10/2012 |
| EP | 0 877 179 A1 | 11/1998 |
| JP | H02-11830 A | 1/1990 |
| JP | 2011-058552 A | 3/2011 |
| WO | 2011/056719 A2 | 5/2011 |

* cited by examiner

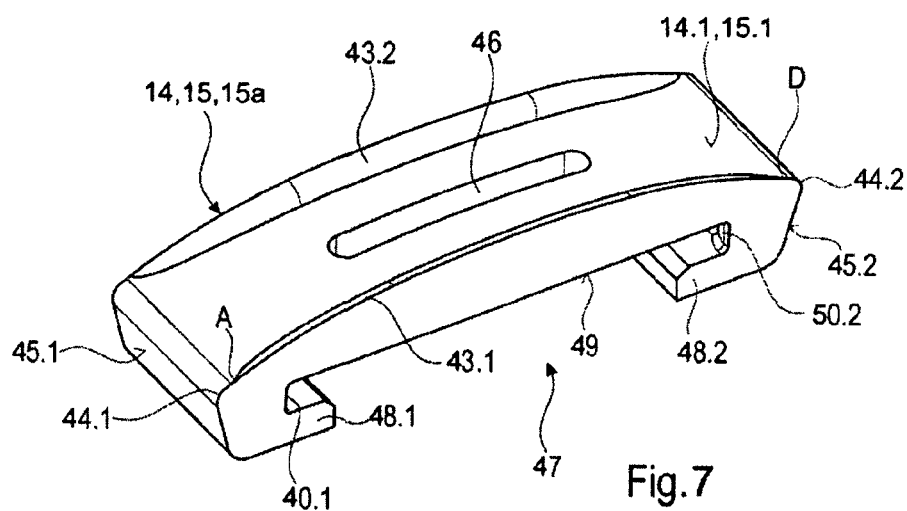
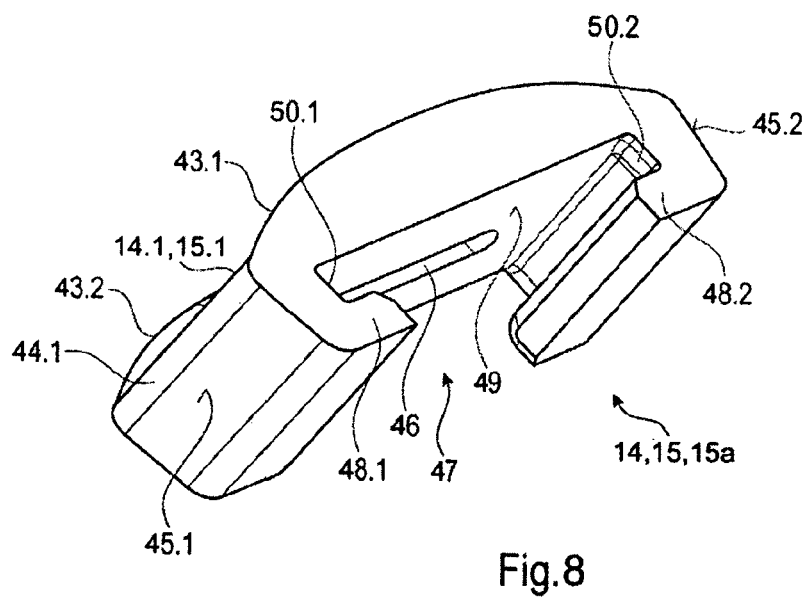

CHAIN DRIVE HAVING A PLURALITY OF SLIDING ELEMENTS

CROSS-REFERENCE TO RELATED APPLICATIONS

This application is a National Stage of International patent application PCT/EP2015/001908, filed on Sep. 25, 2015, which claims priority to foreign German patent application Nos. DE 10 2014 014 720.7, filed on Oct. 2, 2014 and DE 10 2015 008 877.7, filed on Jul. 8, 2015, the disclosures of which are incorporated by reference in their entirety.

FIELD OF THE INVENTION

The present invention relates to a chain drive for an internal combustion engine, comprising a driving sprocket and at least one driven sprocket, a drive chain coupling the sprockets to each other, and at least one guide rail and/or one tensioning rail for guiding and/or tensioning the drive chain, wherein at least the guiding and/or the tensioning rail comprises at least two slide elements, arranged at a non-guided distance from one another for contacting the drive chain, such that at least two slide elements are arranged in at least one span of the chain drive, and wherein in at least one span the ratio of the guided chain length to the non-guided chain length is smaller than 1.

BACKGROUND

This kind of chain drive is known e.g. from DE 19719732 C1. It is a timing chain drive of an internal combustion engine, in the case of which a timing chain couples the crankshaft to the camshaft. In the area of the tight span, a guide rail is arranged, which comprises two slide sections arranged at a non-guided distance from one another. This means that, in a section between the two slide sections, the chain backs of the timing chain do not abut. The two slide sections are interconnected by means of a support. The slide sections are made of a wear-resistant plastic material, whereas the support is made of heavy-duty polyamide with fiber addition. This aims at achieving functional chain guidance, which contributes to a reduction of weight and to a reduction of the amount of material used. In the slack span of the chain drive, a tensioning rail is provided, whose curvature can change as the drive chain wears, whereby a chain stretch of the drive chain during its service life is compensated for. Frequently, also pivotably arranged tensioning rails are used, which are pressed against the slack span of the drive chain by means of a chain tensioner.

Another slide element for reducing the manufacturing effort and the friction is known from DE 102007026939 A1. The sliding-contact surface has recessed sections, whereby it is subdivided into abutting and non-abutting sections.

Although the known devices already provide good effects as regards a reduction of friction, they do not yet represent suitable measures with respect to highly dynamic chain drives for internal combustion engines, so as to cope also with the vibration behavior of these chain drives.

SUMMARY OF THE INVENTION

Hence, it is the object of the present invention to provide a chain drive of the type specified at the beginning, which, as regards vibration behavior, comprises improved, low-friction guiding and/or tensioning rails.

In the case of a chain drive of the generic kind, the above object is achieved in that, in at least one span, which is in contact with a guide rail and/or a tensioning rail with at least two slide elements arranged at a non-guided distance from one another, the sum of the lengths of the two non-guided sections of the drive chain between a slide element and the respective nearest sprocket is smaller than 0.5 times the total length of the respective span. For the purpose of definition, a span is considered to be the strand section of the drive chain extending between two sprockets following one another in the direction of movement. As regards the length of a span, the strand section taken into consideration is only the strand section which extends between the two sprockets following one another in the direction of movement and which is no longer fully in engagement with the respective sprocket. This means that as soon as a chain link of the drive chain leaves the pitch circle predetermined by the sprocket (during exiting) or reaches it (during meshing), the starting or the end point for measuring the span length is defined. Due to the fact that such chain drives have highly dynamic characteristics, a static assessment is preferred in the present connection. In particular in the slack span, the length may also change as the drive chain wears. However, the conditions will normally improve as the tension created by the tensioning rail increases, and, consequently, the length in the new condition will here preferably be taken into consideration.

In addition to a reduction of friction due to a subdivision into various slide elements, the present invention also provides sufficient vibration damping. The drive chain should be guided at the smallest possible distance from the meshing point and the exit point of the sprockets, the least possible number of sliding-contact surfaces being provided between said points, so as to reduce the friction while maintaining good guidance and tension of the drive chain. The subdivision into at least two slide elements may be provided on the guide rail or on the tensioning rail or on both said rails. By means of this concept, also the weight of the respective rails can be reduced and the material and manufacturing costs can be lowered. In addition, this subdivision offers possibilities of installation space optimization. On the basis of vibration analyses, it is also possible to arrange slide elements precisely in the areas where particularly strong vibrations occur. Hence, the present invention can also be used for highly dynamic chain drives in internal combustion engines.

By definition, the length of a span also comprises the section guided by the respective guide rail or the tensioning rail. A non-guided section begins, in relation to the guide rail or the tensioning rail, precisely where a contact between the main sliding-contact surface of the guide rail or of the tensioning rail is just no longer given (during exiting from the rail and the slide element, respectively) or is just re-established (during meshing with the rail and the slide element, respectively). Hence, the non-guided length between two slide elements corresponds to the length of the drive chain, which is not guided by the two slide elements in this section, i.e. which is not in contact with the sliding-contact surfaces with its chain back. The guided chain length in a span results thus from the length sections of the chain which are in contact with the main sliding-contact surface. As regards the non-guided chain length, this chain length comprises, in addition to the non-guided sections between the slide elements, also the non-guided sections between the sprockets and the slide elements of a span. A slide element defines a uniform guide structure with which the chain meshes and from which the chain exits, and may itself be provided with friction-reducing structures (e.g. recesses on the sliding-contact surface).

The most effective possibility of realizing the present invention is a variant according to which at least two spans of the chain drive comprise a guide rail or a tensioning rail with at least two spaced-apart slide elements, the ratio from guided chain length to non-guided chain length being smaller than 1, and the sum of the lengths of the two non-guided sections of the drive chain between a slide element and the respective nearest sprocket being smaller than 0.5 times the total length of the respective span. For most chain drives of an internal combustion engine, this structural design leads to an optimization of the friction reduction and of the vibration behavior.

In addition, according to a variant, the non-guided distance between at least two slide elements arranged on a guide rail and/or a tensioning rail may be larger than 3 times, preferably 5 times, the chain pitch of the drive chain. Hence, a substantial part of the non-guided length of the drive chain is located between the two slide elements, a circumstance which substantially contributes to a reduction of friction and which will also reduce the weight of the rail in question.

According to an advantageous embodiment, the guiding length of at least two slide elements of a guide rail and/or a tensioning rail may be smaller than 10 times the chain pitch of the drive chain. It turned out in practice that such lengths suffice for sufficiently guiding a drive chain, without the guiding forces becoming excessively high. According to a further embodiment, the drive chain length guided by the at least two slide elements should, however, preferably be larger than 2.5 times, preferably larger than 3 times, the chain pitch of the drive chain, so as to keep the respective guiding forces within suitable limits.

According to another embodiment, the number of the slide elements of the guide and/or a tensioning rail(s) contacting the two longest spans corresponds at least to the number of sprockets of the chain drive plus 1, preferably plus 2. This is a design rule which will improve the advantages specified according to the present invention still further and which will become noticeable more and more advantageously, in particular when the number of sprockets increases. Hence, one variant is also configured such that the number of sprockets corresponds at least to 3, preferably precisely to 3. This corresponds e.g. to a timing drive with two overhead camshafts. Although the camshaft sprockets may also have provided rails between them, these rails are left out of consideration in the present context due to the small distance between the two camshaft sprockets. What matters here are the longer spans of the chain drive with respect to sufficient vibration damping and friction reduction of these spans.

In order to allow the use of a modular system, the slide elements of the guide and/or tensioning rail(s) may be identical in size and shape. The slide elements may indeed also be formed integrally with the other elements of a guide rail and/or a tensioning rail, but it turned out that, especially when the respective material is chosen in the target-oriented manner, a mounted embodiment, in the case of which the slide elements represent separate components, will be of advantage.

According to a further variant, the guide rail and/or the tensioning rail therefore comprise(s) a support body having the slide elements mounted thereon. The slide elements may e.g. be configured in the form of sliding lining bodies, which are mounted by means of various connection techniques, or they may represent independent elements with support structures. Preferably, the support function is, however, also fulfilled by the support body. An advantageous mounting method is a locking engagement with the support body by means of suitable locking devices.

According to an embodiment, the support body may comprise at least two fastening portions for the slide elements, said fastening portions having identical outer contours. This means that the fastening portion has so to speak a kind of adapter shape, which allows establishing a connection with the identical slide elements. Provided that the most important functional surfaces and areas required for this purpose are provided, the rest of the structural design of the fastening portion does not matter, and that is why the term outer contours is used in the present context. In most cases, however, the fastening portions will have an identical structural design. Guide rails and tensioning rails can be established in a particularly easy manner, when the slide elements are identical modular parts. According to this variant, the slide elements used are therefore exclusively slide elements that are configured as carry over parts. If these carry over parts have specific predetermined lengths and predetermined opening angles with associated radii of curvature, it will, making use of different supports, also be possible to manufacture differently configured guide and/or tensioning rails with one and the same type of slide element. Low manufacturing costs can be achieved in this way, especially as regards the high numbers of pieces involved in the field of automotive engineering.

According to a preferred embodiment, the guide rail and/or the tensioning rail may comprise two spaced-apart side elements, the sliding-contact surfaces of the slide elements, which are arranged at a non-guided distance from one another, being partially arranged between these side elements, so that a window opening is formed between the slide elements and the side elements. The side elements preferably have a very large cross-section in the loading direction, but in the width direction of the guide rail or the tensioning rail they may have comparatively thin dimensions. Thus, it is possible to create comparatively large window openings, which provide particularly advantageous installation conditions. The side elements may additionally also be used for laterally guiding the chain. Sufficiently high side elements lead to a good bending stiffness of the rail.

In addition, each slide element may have a sliding-contact surface that is convex in the direction of movement of the drive chain, the angle bisectors of the two opening angles of the convex sliding-contact surfaces of the slide elements of a guide rail and/or a tensioning rail extending relative to one another at a non-zero angle $\beta$. Other than in the case of the above described prior art, the two angle bisectors are not oriented parallel to one another, but they extend preferably at an acute angle to one another. Normally, they are slightly divergent. This provides a better adaptation to chain travel, so that also comparatively large intermediate gaps can be bridged by a chain section, without major vibrations being excited in this area. This is e.g. due to the fact that the forces act on these two slide elements at an angle relative to one another.

Opening angle means here the largest angle defined by the sliding-contact surface. The rounded portions at the end of the sliding-contact surface are, however, not considered to be part of the sliding-contact surface. The measurement of the opening angle begins only where the "real" sliding-contact surface begins or ends (i.e. where contact with the drive chain is given). If the sliding-contact surface has a uniform radius of curvature, the angle bisector can easily be determined. If the sliding-contact surface has, in addition to the central area, a meshing and an exit area with identical radii of curvature, which are, however, smaller than the radius of curvature of the central area of the sliding-contact surface, the determination will normally still be comparatively simple. The situation gets more difficult, if the radius of curvature varies continuously. Openings or recesses that may possibly be provided in the sliding-contact surface are completed as regards the radius of curvature in accordance with the adjoining surface areas. The angle β, which is intended to be a non-zero angle, is preferably smaller than 180° and larger than 5°, preferably ≥15°. If the determination of the sliding-contact surface or of the convex length thereof should be problematic or seem to be difficult, the following determination method is used:

The area or point having the largest radius of curvature is determined. This area or point lies with high probability in the region where the sliding-contact surface contacts the chain. Starting from a point of this area or from the point, the radius of curvature or the change of the radius of curvature of the sliding-contact surface is determined in as well as opposite to the direction of movement of the chain. As soon as the radius of curvature only amounts to 25% of the largest radius of curvature, or becomes smaller than this value, the (theoretical) front or rear end of the sliding-contact surface has been reached in the direction taken, and the opening angle can be determined. According to this determination method, the last radius of curvature ≥25% of the radius of curvature is used for determining the opening angle, if the magnitude of the radius of curvature drops abruptly from above to below 25% of the largest radius of curvature. If the largest radius of curvature is larger than 5000 mm (including ∞), the (theoretical) front or rear end of the sliding-contact surface has been reached, when the radius of curvature reaches or becomes smaller than 50 mm, preferably 35 mm.

The chain is preferably not guided along a uniform circular path in a span. To this end, the convex sliding-contact surfaces of the slide elements of a guide rail and/or a tensioning rail may have different centers of curvature. This means that the slide elements are arranged such that the chain is guided and tensioned in different directions, whereby additional vibration damping can be achieved.

BRIEF DESCRIPTION OF THE DRAWINGS

In the following, embodiments of the present invention will be explained in more detail making reference to the drawings, in which:

FIG. 7 shows an enlarged perspective view of a slide element, FIG. 8 shows a perspective bottom view of the slide element according to FIG. 7.

DETAILED DESCRIPTION

Figure 1:
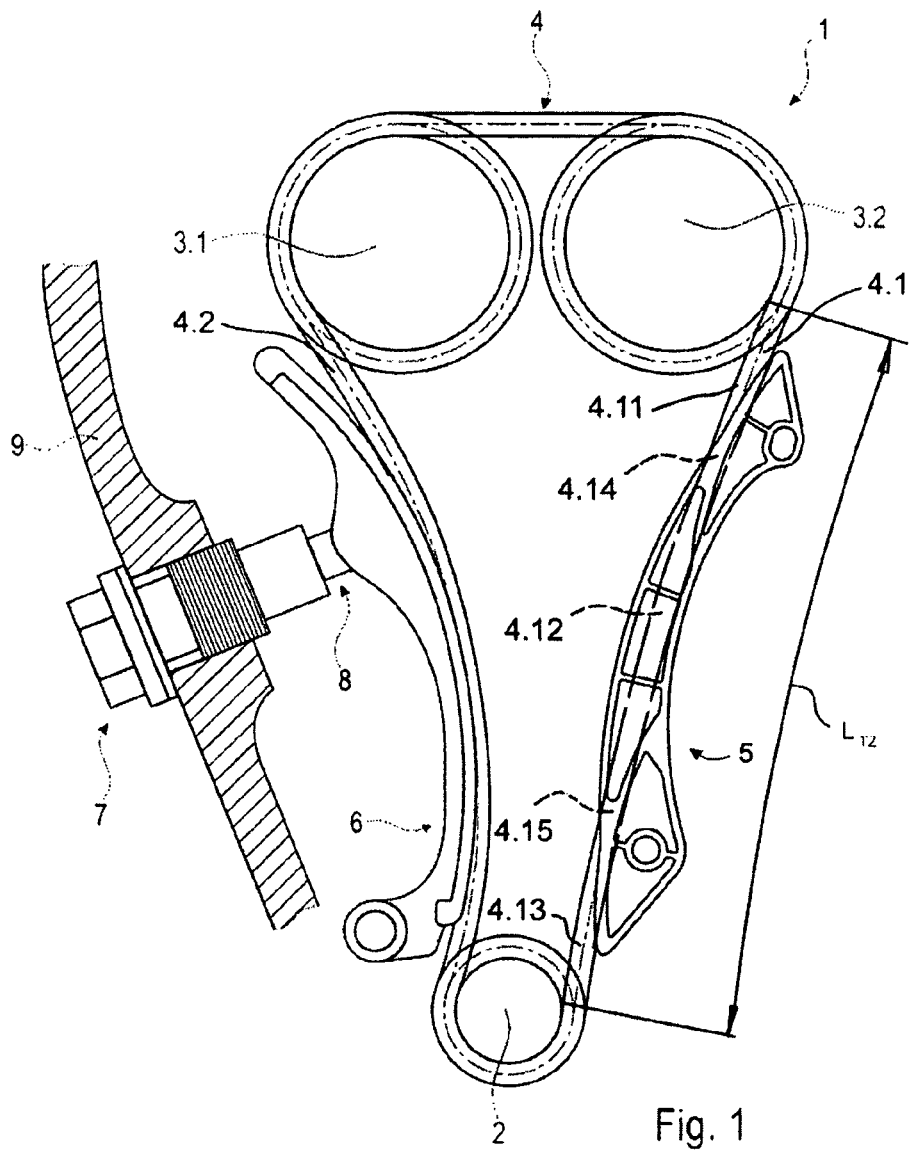
FIG. 1 shows a schematic front view of a timing chain drive.

The timing chain drive 1 for an internal combustion engine shown in FIG. 1 substantially comprises a crankshaft sprocket 2, two juxtaposed camshaft sprockets 3.1 and 3.2, a timing chain 4 wrapped around said sprockets and having a chain pitch T (not shown), a guide rail 5 fixed to the engine case, a tensioning rail 6 pivotably arranged on the engine case, and a chain tensioner 7 pressing against the tensioning rail 6 by means of its tensioning piston 8. In the present case, the chain tensioner 7 is configured as a so-called screw-in chain tensioner, which is screwed into a wall 9 on the engine case. The chain tensioner 7 may, however, also be configured as a flange-type chain tensioner or as an add-on chain tensioner. The crankshaft sprocket 2 drives the two camshaft sprockets 3.1 and 3.2 by means of the timing chain 4. This has the effect that the tight span 4.1 of the timing chain 4 slides along the guide rail 5 and the slack span 4.2 slides along the tensioning rail 6. The chain tensioner 7 must apply a sufficiently strong force to the tensioning rail 6, so that reliable tensioning of the timing chain 4 will be guaranteed over the entire operating range of the internal combustion engine. Highly dynamic processes take here place within the chain tensioner 7, which also provides a damping function. In the following, a detailed structural design of an embodiment of a guide rail 5 will be explained in more detail with the aid of FIGS. 2 and 3, this kind of guide rail 5 being used in a chain drive according to the present invention shown in FIG. 1.

The guide rail 5 is substantially subdivided into three areas, viz. the first contact area 10 at the meshing end of the guide rail 5, the second contact area 11 at the exit end of the guide rail 5 as well as the non-contact area 12 interconnecting the two first-mentioned areas. The guide rail 5 comprises three components. These components are a support body 13, a first slide element 14 on the first contact area 10 and a second slide element 15 on the second contact area 11. The support body 13 is configured as an integral component and consists of a fiber-reinforced plastic material. The support body 13 is structurally subdivided into an approximately triangular support structure 16 of the first contact area 10, an approximately triangular support structure 17 of the second contact area 11 and two arcuate side elements 18.1, 18.2 of the non-contact area 12, said side elements interconnecting the two support structures 16 and 17. The side elements 18.1 and 18.2 define the support structure of the non-contact area 12.

The first support structure 16 has a truss-like structural design and comprises a straight end wall 19, a concave rear wall 20 and a convex front wall 21 having arranged thereon the first slide element 14 with the sliding-contact surface 14.1. At the point where the end wall 29 and the rear wall 20 meet, a fastening eye 22 is arranged, whose cross section has the shape of an elongated hole. Approximately in the middle of the width of the guide rail 5, a support wall 24 is provided, which extends in the longitudinal direction and which closes the truss structure of the first support structure 16 with the exception of the fastening eye 22.

The second support structure 17 comprises a straight end wall 25, a concave rear wall 26 and a convex front wall 27 carrying the second slide element 15. Approximately in the middle of the second support structure 17, a fastening eye 28 having a circular cross-section is provided. A cross member 29 connects the front wall 27 to the fastening eye 28 as well as the fastening eye 28 to the corner point between the end wall 25 and the rear wall 26. The truss structure of the second support structure 17 is closed, approximately in the middle thereof, by a support wall 30, with the exception of the fastening eye 28.

The two side elements 18.1 and 18.2 each have a convex upper surface 31.1 and 31.2 and a concave lower surface 32.1 and 32.2. The side elements 18.1, 18.2 in their entirety are arcuate in shape, the height H of the side elements 18.1, 18.2 increasing continuously from the meshing side to the exit side of the guide rail 5, at least between the two contact areas 10 and 11. The side elements 18.1 and 18.2 are configured as bending beams and are comparatively narrow but high. The two side elements 18.1 and 18.2 are not connected to one another in the area between the two contact areas 10 and 11, so that a window opening 33 is formed. The width $B_D$ of the window opening 33 corresponds substantially to the width of the slide elements 14 and 15 which provide the sliding-contact surfaces 14.1 and 15.1. The length $L_D$ of the window opening 33 corresponds to approximately 0.33 times the length L of the guide rail 5.

Due to the structural design of the guide rail 5, the tight span 4.1 comprises three non-guided sections between the camshaft sprocket 3.2 and the crankshaft sprocket 2. These are firstly the section 4.11 between the camshaft sprocket 3.2 and the upper slide element 14, the section 4.12 in the area of the window opening 33 and the section 4.13 between the lower slide element 15 and the crankshaft sprocket 2. Between these sections, the two guided sections 4.14 and 4.15 are located, which, accordingly, are in contact with the sliding-contact surface 14.1 of slide element 14 and the sliding-contact surface 15.1 of slide element 15. The length of the tight span $L_{TZ}$ results from the strand section of the timing chain 4 which is no longer in contact with the sprockets 3.2 and 2. The subdivision is such that the sum of the lengths of the non-guided sections 4.11, 4.12 and 4.13 is larger than the sum of the lengths of the guided sections 4.14 and 4.15. In addition, the sum of the lengths of the non-guided sections 4.11 and 4.13 is smaller than half the span length $L_{TZ}$. The arcuate shape of the guide rail 5 comprising the two contact areas 10 and 11 in combination with the intermediate window opening 33 additionally offers the possibility of guiding the guide rail 5 so to speak around housing contours, housing elements and other structures, and of positioning these elements and contours comparatively close to the outer side of the timing chain 4. The timing chain 4 can thus be guided such that it passes the housing contour in very closely spaced relationship therewith. This allows an optimum utilization of installation space conditions, even if the latter are very limited. The highest-load section is located, in particular due to the convex shape of the sliding-contact surfaces 14.1 and 15.1, substantially above the fastening eyes 22 and 28. In the area of the window opening 33, no load at all is applied. This load distribution leads to a reduction of the peak forces, and, due to the reduced length of the sliding-contact surfaces 14.1 and 15.1, the friction will be reduced as well.

Figure 2:
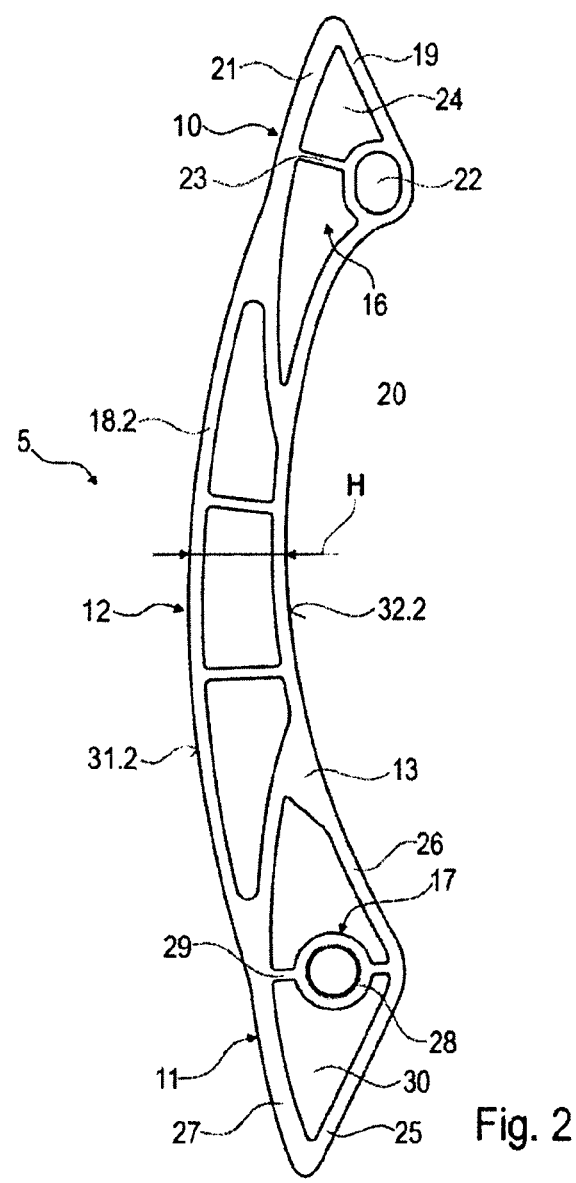
FIG. 2 shows a guide rail according to the present invention in a side view.
Figure 3:
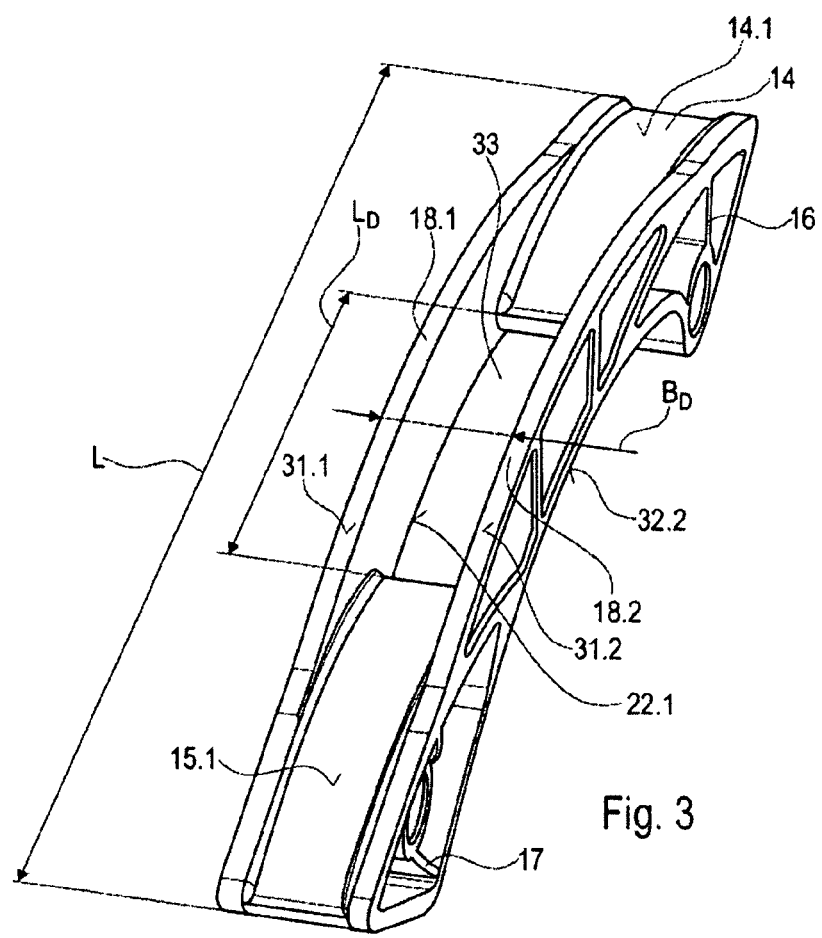
FIG. 3 shows the guide rail according to FIG. 2 in a perspective top view.

Even though not explicitly shown in the present context, the construction principle for a guide rail 5 shown on the basis of FIGS. 2 and 3 may equally be transferred also to a tensioning rail 6. Instead of the fastening eye 22 in the meshing area, the tensioning rail 6 then has provided thereon a press-on area for contact with the tensioning piston 8. Also the tensioning rail 6 has then two spaced-apart contact areas 10, 11 connected to one another by means of the non-contact area 12 (in this concrete case the two side elements 18.1, 18.2).

The chain drive 1 shown in FIG. 1 has a single continuous slide element on the tensioning rail 6.

In the following, a further embodiment of the present invention will be explained making reference to FIG. 4 to 12. Only the essential differences in comparison with the preceding embodiment will be discussed hereinafter. If identical components or components producing the same effect are referred to, identical reference numerals will be used and the above description will additionally be referred to.

Figure 4:
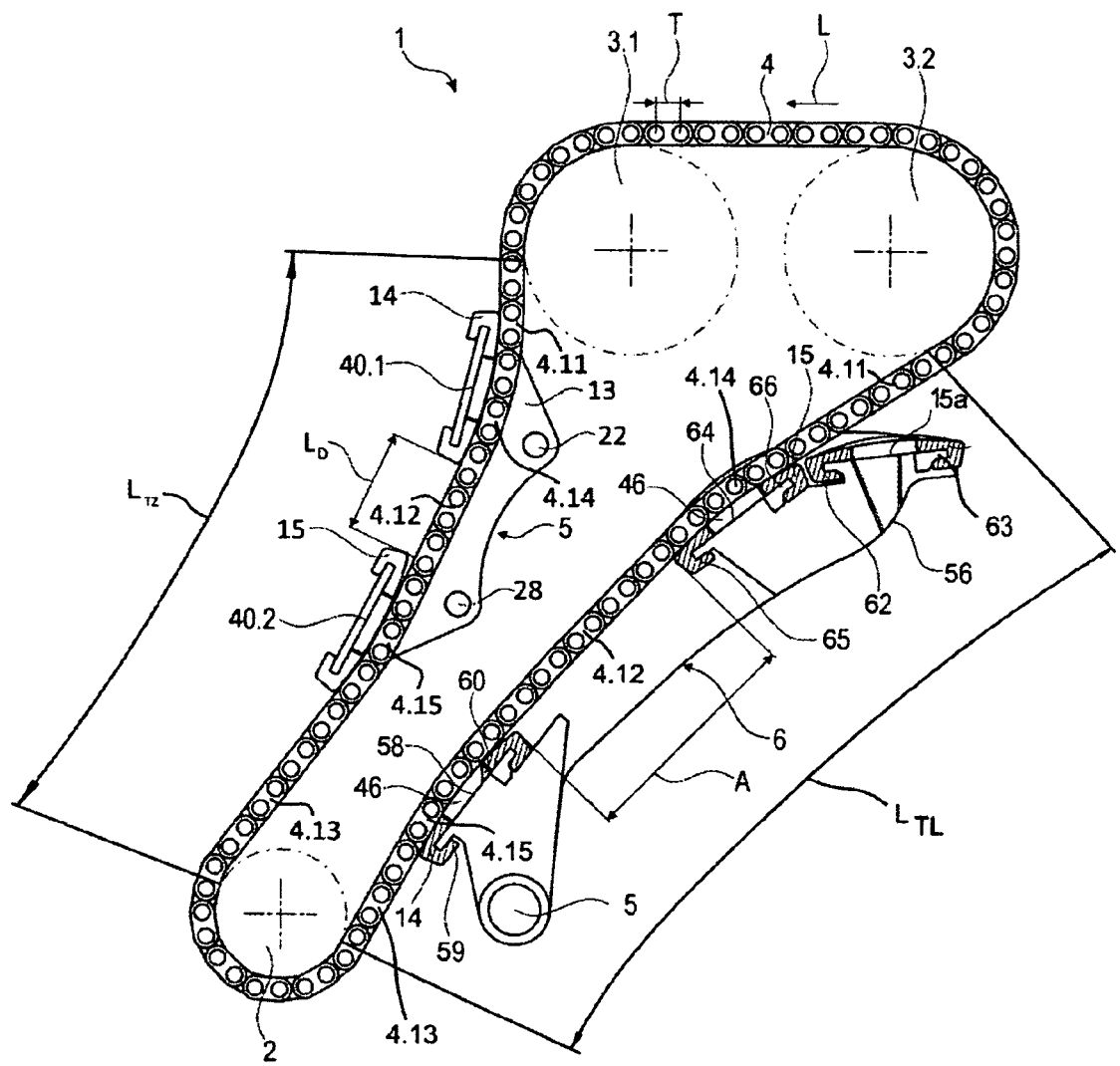
FIG. 4 shows a schematic front view of a further timing chain drive.
Figure 5:
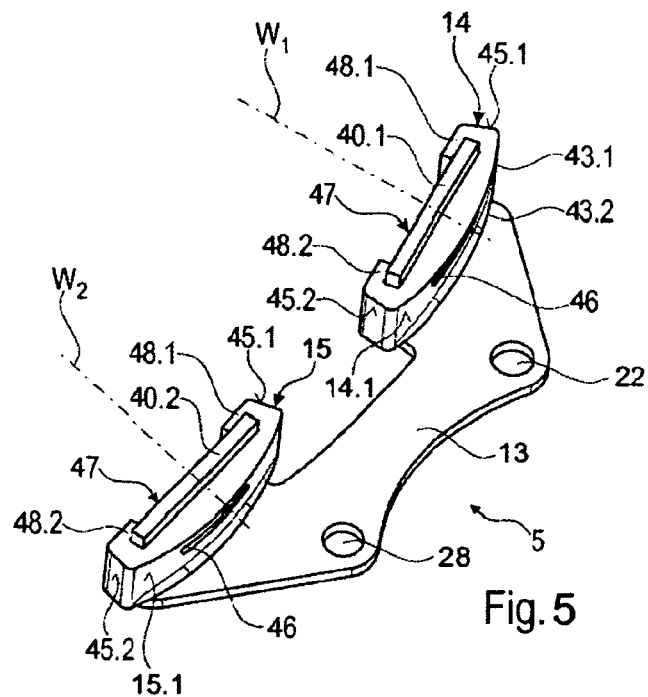
FIG. 5 shows a perspective representation of the guide rail according to FIG. 4.
Figure 6:
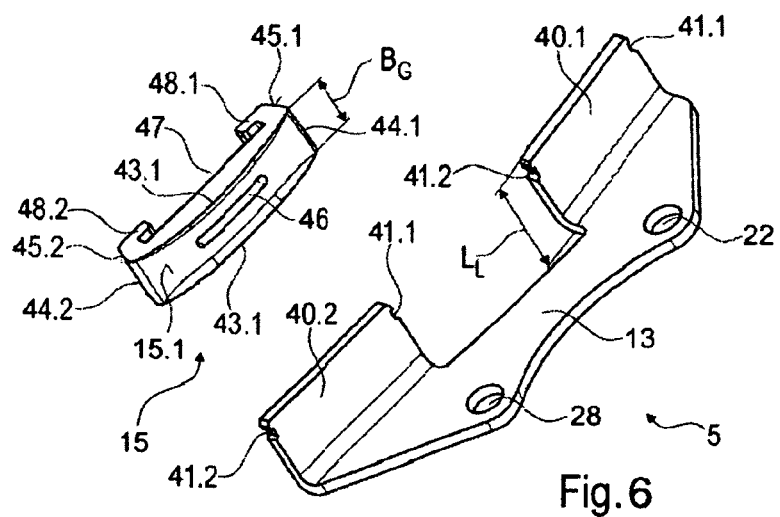
FIG. 6 shows an exploded view of the guide rail according to FIG. 5, in which a slide element has been omitted for reasons of simplification.
Figure 9:
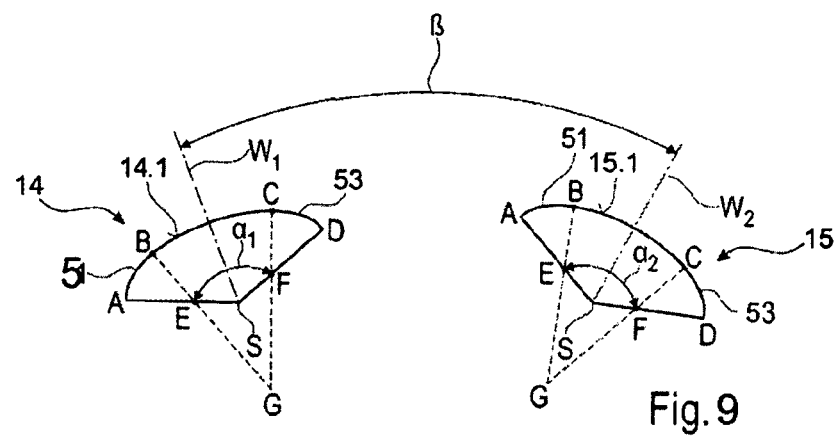
FIG. 9 shows a schematic diagram for explaining the arrangement of the two slide elements.

The timing chain drive 1 shown in FIG. 4 makes use of a bush-type chain having the pitch T. The direction of rotation of the crankshaft sprocket 2 is opposite to that in the case of the timing chain drive 1 according to FIG. 1 and, consequently, the sides on which the guide rail 5 and the tensioning rail 6 are arranged have been reversed. The guide rail 5 consists of three components. These components are a support body 13 made of sheet steel on the one hand and two slide elements 14 and 15 connected to the support body 13 on the other. The support body 13 comprises a flat main component provided with two fastening openings 22, 28, with the aid of which it is secured to the engine block. Two fastening lugs 40.1 and 40.2 project from this main component such that they are bent at right angles thereto. The fastening lugs 40.1 and 40.2 define the fastening portions of the otherwise flat support body 13. The projecting length $L_L$ of the fastening lugs 40.1 and 40.2 is slightly larger than the width $B_G$ of the slide elements 14 and 15, respectively. At the smallest distance from the free edge of the fastening lugs 40.1 and 40.2, each of the side edges is provided with a rounded recess 41.1 and 41.2 (cf. FIGS. 5 and 6).

The slide elements 40.1 and 40.2 are each produced from a low-friction plastic material, normally by means of injection molding. On the upper side, each slide element 14, 15 has a convex sliding-contact surface 14.1 and 15.1, which enters into contact with the timing chain 4. The sliding-contact surfaces 14.1, 15.1 are laterally delimited by guide flanges 43.1 and 43.2. Making use of a rounded portion 44.1 and 44.2, the sliding-contact surfaces 14.1 and 15.1 merge with the conically converging side faces 45.1 and 45.2 at the respective front and rear ends. The sliding-contact surfaces 14.1 and 15.1 have in the middle thereof an elongated hole 46 extending through the material up to the rear. On the rear side, the slide element 14, 15 is provided with a substantially T-shaped recess 47. Due to this T-shaped recess 47, two projecting legs 48.1 and 48.2 are formed on the rear side. The distance between the inner side of the legs 48.1 and 48.2 and the bottom 49 of the T-shaped recess is chosen such that a respective fastening lug 40.1 or 40.2 can be inserted thereinto. On one end of the T-shaped recess (in FIG. 7 the front end), the T-shaped recess has provided therein projections 50.1 and 50.2 which can enter into locking engagement with the recesses 41.1 and 41.2 of the fastening lugs 40.1 and 40.2. On the basis of this structural design, the slide elements 14 and 15 can laterally be attached to and locked on the fastening lugs 40.1 and 40.2 very easily. The slide element 14 or 15 is so elastic that the projections 50.1 and 50.2 slide along the outer edges of the fastening lugs 40.1, 40.2 and enter then into locking engagement with the recesses 41.1 and 41.2. The free end of the fastening lugs 40.1 and 40.2 will then slightly protrude. The upper side of the fastening lugs 40.1 and 40.2 then covers the open elongated hole 46 from below. Lubricating oil can then accumulate therein during future operation. The two fastening lugs 40.1 and 40.2 therefore have an identical outer contour for fastening the slide elements 14 and 15.

As regards the fastening lugs 40.1 and 40.2, it should be pointed out that they slightly converge, i.e. their upper sides do not define a common plane and are not oriented parallel to one another, but are slightly tilted at an angle relative to one another. This has the effect that also the slide elements 14 and 15 are slightly rotated relative to one another. Making reference to FIG. 9, this will be explained on the basis of an example in the case of which the respective sliding-contact surface 14.1 and 15.1 is composed of three sections with different radii of curvature. The aim of this representation is, substantially, to determine an opening angle $\alpha_1$ and $\alpha_2$ for the slide element 14 and 15, respectively, and to ascertain then a corresponding angle $\beta$ between the angle bisectors $W_1$ and $W_2$ of the two opening angles $\alpha_1$ and $\alpha_2$ of the slide elements 14 and 15.

Each of the slide elements 14, 15 has on its sliding-contact surface 14.1, 15.1 a meshing portion 51, a central portion 52 and an exit portion 53. The meshing portion 51 of the slide element 14 has a radius of curvature with the distance A-E. The central portion 52 has a radius of curvature with the distance B-G, and the exit portion 53 has a radius of curvature with the distance D-F. In the case of this assessment, points A and D are located where the actual sliding-contact surfaces 14.1 and 15.2 begin, i.e. without the rounded portions 44.1 and 44.2. If this is not precisely clear, it may alternatively be assumed that the distance is 5 mm from the respective side face 45.1, 45.2.

For determining the opening angle $\alpha_1$ and $\alpha_2$, the line A-E as well as the line D-F are extended, so that a point of intersection S is formed. The angle enclosed between these two lines is the opening angle $\alpha_1$ and $\alpha_2$. Subsequently, the angle bisectors $W_1$ and $W_2$ of the angles $\alpha_1$ and $\alpha_2$ are formed. The two angle bisectors $W_1$ and $W_2$ extend at an acute angle $\beta$ relative to one another.

The meshing portion 51 extends between points A and B. The central portion 52 extends between points B and C. The exit portion 53 extends between points C and D.

Due to this tilt or rotational displacement of the two slide elements 14 and 15 relative to one another, the tight span 4.1 is guided in a target-oriented manner between the crankshaft sprocket 2 and the camshaft sprocket 3.1. The distance $L_D$ between the two slide elements 14 and 15 is, in the present case, about four times as large as the chain pitch T, and is therefore larger than three times the chain pitch, and is preferably five times as large as the chain pitch T. In this area, the chain 4 is not supported by the guide rail 5. Due to the fact that the slide elements 14 and 15 are rotationally displaced relative to one another by the angle $\beta$, optimum guidance is nevertheless provided, and this will calm the section of the timing chain 4 between the slide elements 14 and 15. The length $L_{TZ}$ of the tight span 4.1 is only shown in an idealized representation in FIG. 4. In actual fact, this must be the entire length of the non-straight chain strand between these points. The same applies to the guided sections 4.14 and 4.15 and the non-guided sections 4.11, 4.12 and 4.13. The sum of the lengths of the non-guided sections 4.11, 4.12 and 4.13 is again larger than the sum of the lengths of the guided sections 4.14 and 4.15. In addition, the sum of the two sublengths of the non-guided sections 4.11 and 4.13 of the timing chain 4 is smaller than 50% of the entire length $L_{TZ}$ of the tight span 4.1.

Figure 10:
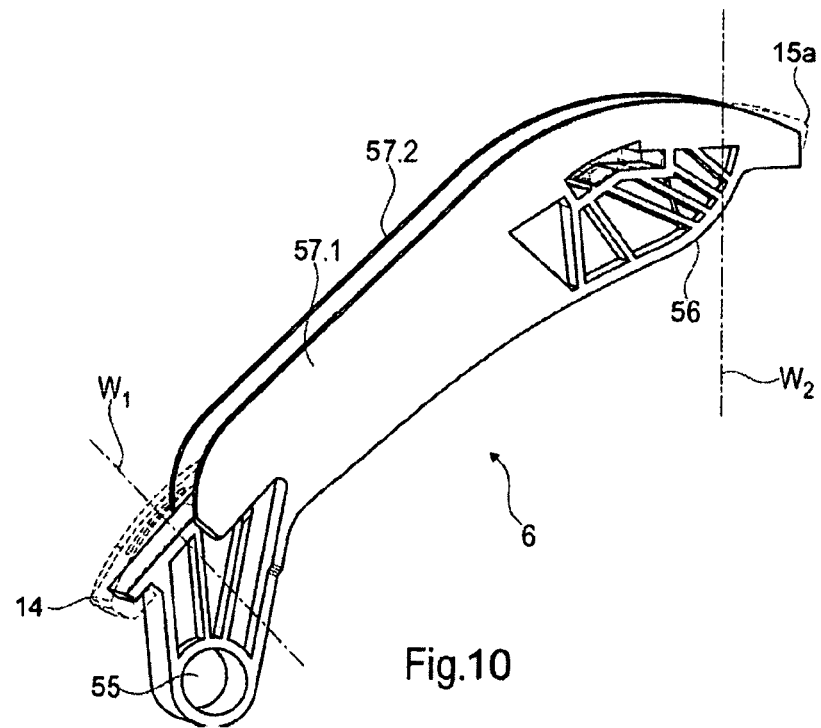
FIG. 10 shows a perspective side view of a tensioning rail according to FIG. 4.
Figure 11:
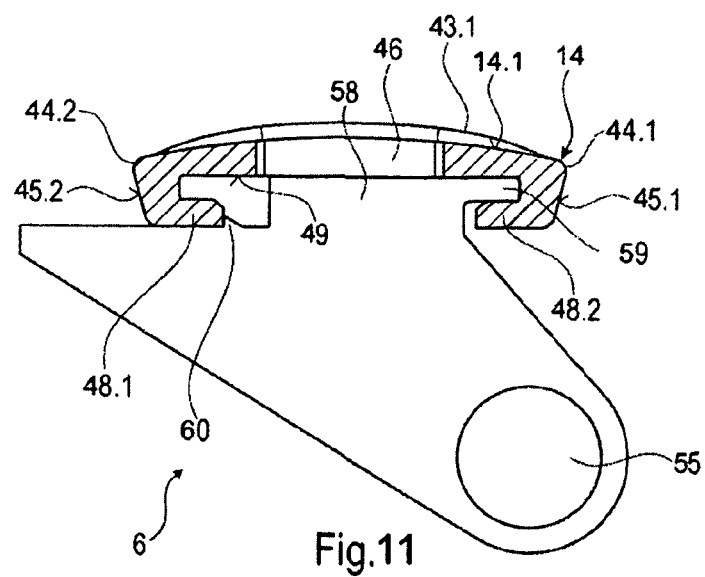
FIG. 11 shows a detail of the pivot end of the tensioning rail in an enlarged sectional view.
Figure 12:
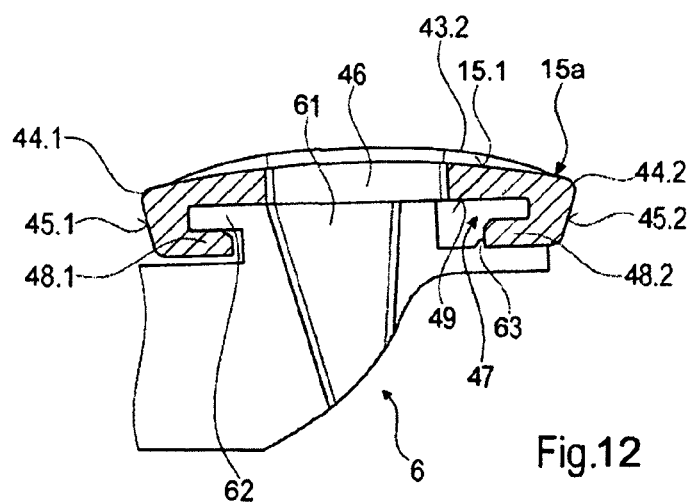
FIG. 12 shows a detail of the front end of the tensioning rail according to FIG. 10 in an enlarged sectional view.

In the following, the structural design of the tensioning rail 6 will now be explained in more detail making reference to FIG. 10 to 12. Identically designed slide elements 14 and 15 are here used, and, consequently, FIGS. 7, 8 and 9 will additionally be referred to with identical reference numerals. In this respect reference will be made to the above description.

The tensioning rail 6 comprises a support 54 made of a fiber-reinforced plastic material. Part of this support 54 is provided with a truss structure for reasons of stability. One end has formed thereon a pivot bearing 55, and the other end has provided thereon a convex press-on area 56 onto which the tensioning piston of a chain tensioner presses, said tensioning piston being not shown. The support 54 has two vertically extended side walls 57.1 and 57.2. In FIG. 4, the tensioning rail 6 is shown in full section. In addition to the two slide elements 14 and 15, the tensioning rail 6 has attached thereto a further, third slide element 15a. The slide element 15a adjoins the slide element 15 substantially directly, but is arranged such that it is rotated or tilted relative thereto by a further angle, so that, in the free end area of the tensioning rail 6, it can enter into larger contact with or into a different kind of contact with the chain 4. This depends then to high degree on the pivotal position of the tensioning rail 6. FIG. 4 essentially shows a position existing when the chain 4 is new. In the course of use, the chain will elongate due to wear, whereby the tensioning rail 6 will pivot anticlockwise further and further and the slide element 15a will increasingly enter into contact with the chain 4. The successive arrangement of these identically configured slide elements 15 and 15a provides this extension of function in the case of the tensioning rail 6. Between the slide elements 14 and 15 a distance A remains, which, in the present case, corresponds to approximately nine times the pitch T.

In the following, the mounting mode of the slide elements 14, 15 and 15a will be explained in more detail making reference to FIGS. 11 and 12. The slide element 15a is pushed onto a respective fastening structure on the support 54 in the same way.

Above the pivot bearing 55, the support 54 is provided with a mounting block 58 having a flange 59 that projects to one side. The flange 59 is dimensioned such that it can be inserted in the area between the bottom 49 and the leg 48.2. The flange 59 may also be provided with a recess, which is not shown and which is similar to a recess of the type provided in the fastening lugs 40.1 and 40.2, the projection 50.2 being adapted to enter into locking engagement with said recess. On the opposite side, the mounting block 58 does not exhibit such a flange 59. Instead, the support 54 is provided with a locking strip 60, which is adapted to be locked in position on the end face of the leg 48.1. To this end, the slide element 14 is attached such that the lower surface of the leg 48.1 is positioned on the beveled locking strip 60. Subsequently, the slide element 14 is longitudinally displaced (in FIG. 11 to the left), so that the flange 59 will be pushed over the leg 48.2. As soon as the slide element 14 has been advanced far enough, the end face of the leg 48.1 will snap into position at the locking strip 60. Due to the side walls 57.1, 57.2, the lateral orientation of the slide element 14 is given and the projection 50.2 will come into engagement with the non-shown recess in the flange 59. The slide element 15a is mounted in the same way and in the same direction (cf. FIG. 12). To this end, a mounting block 61 having a flange 62 is provided on the front end of the support 54, and a locking strip 63 is provided. The distance between the perpendicular side of the locking strip 63 and the end face of the flange 62 is larger than the opening width of the T-shaped recess 47; the distance between the end face of the flange 59 and the perpendicular side of the locking strip 63 corresponds, however, substantially to the largest width of the T-shaped recess 47 minus the width of the leg 48.2.

The slide element 15 is mounted in the same way and in the same direction, with the aid of an identically configured mounting block 64, a flange 65 and a locking strip 66. The sequence is therefore such that the slide element 15a is arranged before the slide element 15. Due to this modular design, it is, of course, also possible to manufacture rails, in the case of which even more of these slide elements are arranged in succession. In view of the fact that the slide elements 14, 15, 15a are arranged such that they are tilted or rotated relative to one another, it is also possible to create different curvatures, depending on the angle chosen.

The particular advantage of this structural design is to be seen in that two different supports, viz. the supports 13 and 54, are provided according to a modular concept, the respective supports being each equipped with identically configured slide elements 14, 15 and 15a. This provides the possibility of manufacturing a great variety of slide rails and tensioning rails by simply providing suitably adapted supports. The sliding lining is established exclusively by slide elements of the modular system. Within the modular system, it will, of course, be particularly advantageous when all the slide elements have an identical structural design. Alternatively, it is naturally possible that e.g. slide elements having different lengths or different radii of curvature are available in the modular system, so as to increase the variation possibilities still further. The mounting blocks 58, 61, 64 have therefore an identical outer contour for fastening the slide elements 14, 15 and 15a.

As regards the guide rail 5, the guiding length of slide element 14 is approximately 6 times as large as the chain pitch T, and the guiding length of slide element 15 is approximately 5 times as large as the chain pitch T (and is therefore smaller than 10 times the chain pitch T and larger than 2.5 times the chain pitch T). As regards the tensioning rail 6, the situation is such that the guiding length of slide element 14 is approximately 6 times as large as the chain pitch T and the guiding length of slide element 15 is approximately 6 times as large as the chain pitch T (corresponds thus to the demand of being smaller than 10 times the chain pitch T and larger than 2.5 times the chain pitch T). As regards the slack span 4.2, an idealized length $L_{TL}$ is again shown. The actual length corresponds to the actual length of the chain piece in this area. Also in the case of the slack span 4.2 the situation is such that the sum of the lengths of the non-guided sections 4.11, 4.12 and 4.13 of the timing chain 4 is larger than the lengths of the guided sections 4.14 and 4.15 of the timing chain 4. In addition, importance has been attached to the feature that, already in the new condition of the timing chain 4 shown, the sum of the lengths of the non-guided sections 4.11 and 4.13 is smaller than half the length $L_{TL}$ of the slack span 4.2.

In addition, it can be seen that the timing chain drive 1 fulfils the requirement that the total number of the slide elements 14, 15 and 15a of the two longest spans 4.1 and 4.2, which is five in the present case, should be larger than the number of sprockets, which is three in the present case (and fulfils thus the condition that the number of slide elements should correspond at least to the number of sprockets plus 1).

The structural design according to the present invention allows to achieve advantages with respect to friction, weight, material and manufacturing costs as well as an optimization of installation space. Also the carry over part concept has here an advantageous effect. Furthermore, advantages are achieved with respect to the vibration behavior, and the chain drive 1 can be constructed such that additional slide elements can be provided in areas where particularly strong vibrations occur.

LIST OF REFERENCE NUMERALS 1 timing chain drive
2 crankshaft sprocket
3.1, 3.2 camshaft sprocket
4 timing chain
5 guide rail
6 tensioning rail
7 chain tensioner
8 tensioning piston
9 wall
10 first contact area
11 second contact area
12 non-contact area
13 support body
14 first slide element
15 second slide element
15a third slide element
16 first support structure
17 second support structure
18.1, 18.2 side elements
19 end wall
20 rear wall
21 front wall
22 fastening eye
23 cross member
24 support wall
25 end wall
26 rear wall
27 front wall
28 fastening eye
29 cross member
30 support wall
31 upper surface
32 lower surface
33 window opening
34 contour
35 outer side
40.1, 40.2 fastening lugs
41 recess
42 sliding-contact surface
43.1, 43.2 guide flange
44.1, 44.2 transition radius
45.1, 45.2 side face
46 elongated hole
47 T-shaped recess
48.1, 48.2 legs
49 bottom
50.1 50.2 projection
51 meshing portion
52 central portion
53 exit portion
55 pivot bearing
56 convex press-on area
57.1, 57.2 side wall
58.1, 58.2 mounting block
59 flange
60 locking strip
61 mounting block
62 flange
63 locking strip
64 mounting block
65 flange 66 locking strip
T pitch
$L_L$ length
$B_G$ width
$α_1, α_2$ opening angle
S point of intersection
$W_1, W_2$ angle bisectors
β angle
A distance
$B_D$ width (window opening)
H height
L length
$L_D$ length (window opening) and distance, respectively
$L_{TL}$ length (slack span)
$L_{TZ}$ length (tight span)

The invention claimed is:

1. A chain drive for an internal combustion engine, the chain drive comprising:
   a driving sprocket;
   at least one driven sprocket;
   a drive chain coupling the driving sprocket and the at least one driven sprocket to each other; and
   at least one of a guide rail and a tensioning rail for at least one of guiding and tensioning the drive chain, wherein
   the at least one of the guide rail and the tensioning rail comprising at least two slide elements, arranged at a non-guided distance from one another for contacting the drive chain, such that the at least two slide elements are arranged in at least one span of the chain drive and contact a same side of the at least one span of the chain drive,
   a ratio of guided chain length to non-guided chain length in the at least one span is less than 1,
   a sum of non-guided lengths of the drive chain between a respective slide element of the at least two slide elements and the respective nearest sprocket is less than 0.5 times a total length of the respective span, and
   the at least one of the guide rail and the tensioning rail comprising two spaced-apart side elements, the side elements including sliding-contact surfaces, which are arranged at a non-guided distance from one another partially between the side elements, so that a window opening is formed between the slide elements and the side elements.

2. The chain drive according to claim 1, wherein,
   in the case of at least two spans of the chain drive, the at least one of the guide rail and the tensioning rail with the at least two slide elements arranged at the non-guided distance from one another is provided,
   the ratio from guided chain length to non-guided chain length is less than 1, and
   the sum of the non-guided lengths of the drive chain between the respective slide element and the respective nearest sprocket is less than 0.5 times the total length of the respective span.

3. The chain drive according to claim 1, wherein the non-guided distance between the at least two slide elements arranged on the at least one of the guide rail and the tensioning rail is greater than 3 times a chain pitch of the drive chain.

4. The chain drive according to claim 1, wherein the guided chain length is less than 10 times a chain pitch of the drive chain.

5. The chain drive according to claim 4, wherein the guided chain length is greater than 2.5 times a chain pitch of the drive chain.

6. The chain drive according to claim 1, wherein the total number of slide elements of the at least two slide elements corresponds at least to the total number of sprockets of the chain drive plus 1.

7. The chain drive according to claim 1, wherein the at least two slide elements are identical in size and shape.

8. The chain drive according to claim 1, wherein the at least one of the guide rail and the tensioning rail comprising a support body having the at least two slide elements mounted thereon.

9. The chain drive according to claim 8, wherein the support body comprises at least two fastening portions for the at least two slide elements, said fastening portions having identical outer contours.

10. The chain drive according to claim 9, wherein the at least two slide elements are identical modular parts.

11. The chain drive according to claim 1, wherein each of the at least two slide elements has a sliding-contact surface that is convex in a direction of movement of the drive chain, and the convex sliding-contact surfaces have different centers of curvature.

12. The chain drive according to claim 1, wherein the non-guided distance between the at least two slide elements arranged on the at least one of the guide rail and the tensioning rail is greater than 5 times a chain pitch of the drive chain.

13. The chain drive according to claim 4, wherein the guided chain length is greater than 3 times a chain pitch of the drive chain.

14. The chain drive according to claim 1, wherein the total number of slide elements of the at least two slide elements corresponds at least to the total number of sprockets of the chain drive plus 2.

15. The chain drive according to claim 6 or 14, wherein the total number of sprockets corresponds to at least 3.

16. The chain drive according to claim 6 or 14, wherein the total number of sprockets corresponds to precisely 3.

17. A chain drive for an internal combustion engine, the chain drive comprising:
   a driving sprocket;
   at least one driven sprocket;
   a drive chain coupling the driving sprocket and the at least one driven sprocket to each other, the drive chain including a tight span and a slack span;
   a guide rail for guiding the drive chain, the guide rail is fixed to an engine case of the internal combustion engine and contacting the tight span; and
   a tensioning rail for tensioning the drive chain, the tensioning rail is pivotally arranged on the engine case and is pressed against the slack span via a chain tensioner, wherein
   at least one of the guide rail and the tensioning rail comprising at least two slide elements, arranged at a non-guided distance from one another for contacting the drive chain, such that the at least two slide elements are arranged in at least one of the tight span and the slack span and contact a same side of the at least one of the tight span and the slack span,
   a ratio of guided chain length to non-guided chain length in the at least one of the tight span and the slack span is less than 1,
   a sum of non-guided lengths of the drive chain between a respective slide element of the at least two slide elements and the respective nearest sprocket is less than 0.5 times a total length of the respective span, and
   the at least one of the guide rail and the tensioning rail comprising two spaced-apart side elements, the side elements including sliding-contact surfaces, which are arranged at a non-guided distance from one another partially between the side elements, so that a window opening is formed between the slide elements and the side elements.

\* \* \* \* \*